United States Patent

[11] 3,569,911

[72] Inventor Raymond Bogdanowicz
 16727 Van Aken, Shaker Heights, Ohio 44120
[21] Appl. No. 770,706
[22] Filed Oct. 25, 1968
[45] Patented Mar. 9, 1971

[54] TERMINAL BOX
 4 Claims, 5 Drawing Figs.
[52] U.S. Cl. .................................................. 339/95, 339/198
[51] Int. Cl. ...................................................... H01r 9/08
[50] Field of Search ........................................... 339/95 (D), 198

[56] References Cited
UNITED STATES PATENTS
2,780,791  2/1957  Morschel ..................... 339/198
3,060,399  10/1962  Pistey ......................... 339/53
3,152,851  10/1964  McLaughlin ................. 339/95(D)
FOREIGN PATENTS
567,029  9/1957  Italy ............................ 339/95(D)

Primary Examiner—Marvin A. Champion
Assistant Examiner—Robert A. Hafer
Attorney—Fleit, Gipple and Jacobson ABSTRACT: A terminal box arrangement with an insulated housing member having side and end walls. The end walls have apertures therein, for guiding electric conductors into the housing. Mounted inside the walls of the housing is a leaf spring, the free ends of which intersect the axes of the apertures, providing locking means for conductors entering the housing through the apertures. Tool passageways are positioned in each end wall, adjacent each of the apertures, providing access to the arms of the leaf spring.

Patented March 9, 1971

INVENTOR
RAYMOND BOGDANOWICZ

BY Stevens, Davis, Miller & Mosher
ATTORNEYS

INVENTOR
RAYMOND BOGDANOWICZ

BY Stevens Davis Miller & Mosher
ATTORNEYS

TERMINAL BOX

This invention relates to a terminal box and more particularly, to a screwless-type box for quickly connecting electric wires.

Terminal boxes for interconnecting a plurality of electrical conductors are known but require the use of tools such as screwdrivers or soldering equipment for connecting each conductor to the box. In field installations, such as in wiring large numbers of rows of fluorescent fixtures with plural fixtures in each row, the stripping of the wire and the preparation of the stripped ends for application to screwed terminals or solder terminals and the manipulation of the tools to complete the connections is a time-consuming and expensive process.

It is an object of this invention to produce a terminal box for interconnecting large numbers of wires that does not require the use of tools.

It is a further object of this invention to produce a terminal box as aforesaid which permits the wiring to be removed when necessary by means of a simple tool.

It is a further object of this invention to produce a terminal box as aforesaid which is made of few parts and is economical to manufacture.

These and other objects of the invention will become manifest upon reading the following description in conjunction with the accompanying drawings wherein.

Figure 1:
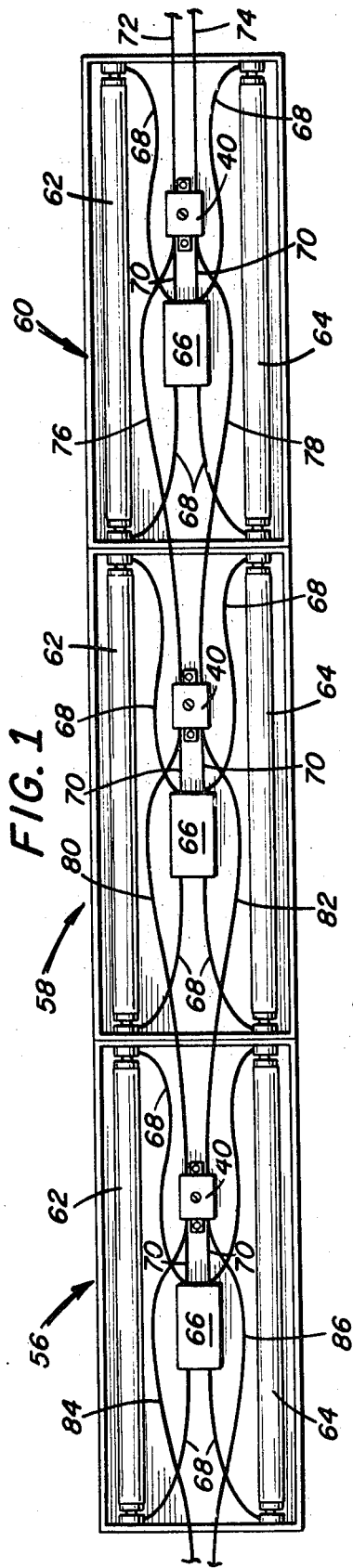
FIG. 1 illustrates the terminal box of my invention in use in a row of fluorescent light fixtures.
Figure 5:
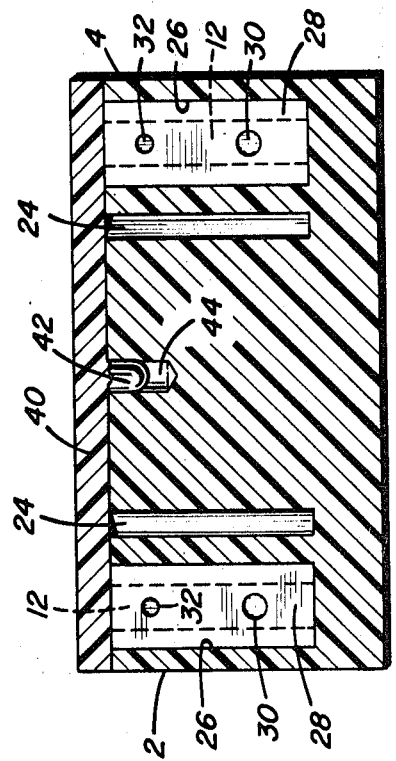
FIG. 5 is a section taken on the line 5–5 of FIG. 3.
Figure 2:
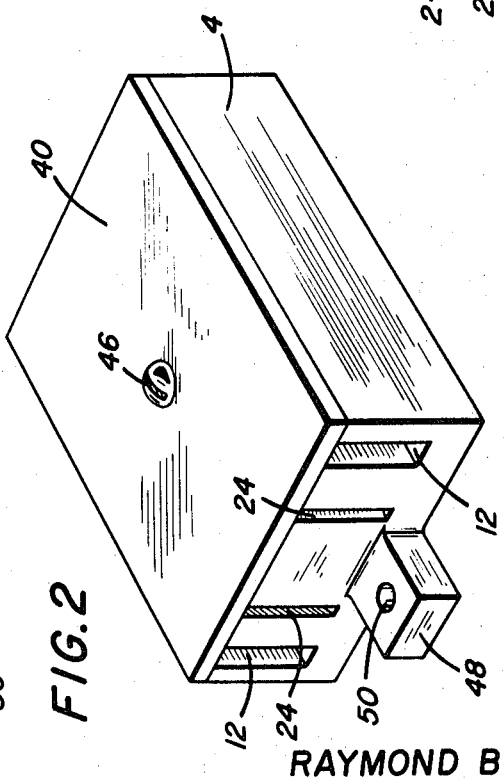
FIG. 2 is a perspective view of the box.

With reference to the drawing, there is disclosed a housing having sidewalls 2, 4, end walls 6, 8, and a central partition 10. Each end wall is formed with apertures 12 for guiding an electrical conductor such as shown at 14 into the housing. A U-shaped leaf spring with a light portion 16 is secured to each side of partition 10 with the legs 18 and 20 supported against the inner surfaces of the end walls and with the end portions of the legs overlapping the apertures 12. Fulcrums 22 are molded integrally with the sidewalls and are positioned between the ends of the legs and apertures 12. The partition is formed with extensions 34 and posts 36 are formed integral with the floor 38. The light portion of the spring extends between the posts 36 and extensions 34 and the legs are bent around the end posts to secure the spring in the housing.

The end walls are formed with passageways 24 for reception of a releasing tool.

The sidewalls of apertures 12 are formed with recesses 26 and fiber guides 28 having openings 30, 32 are fitted into the recesses for supporting and guiding the stripped ends of the conductors.

A cover 40 of electrical insulating material is mounted on the upper surface of the housing. The cover is formed with guide pins 42 for reception into locating holes 44 formed in the housing walls 6 and 8. The center of the partition is threaded for reception of a locking screw 46 to secure the cover to the body.

Securing lugs 48 are molded integrally with the end walls and are formed with apertures 50 for reception of fasteners to secure the box in operative location.

Figure 3:
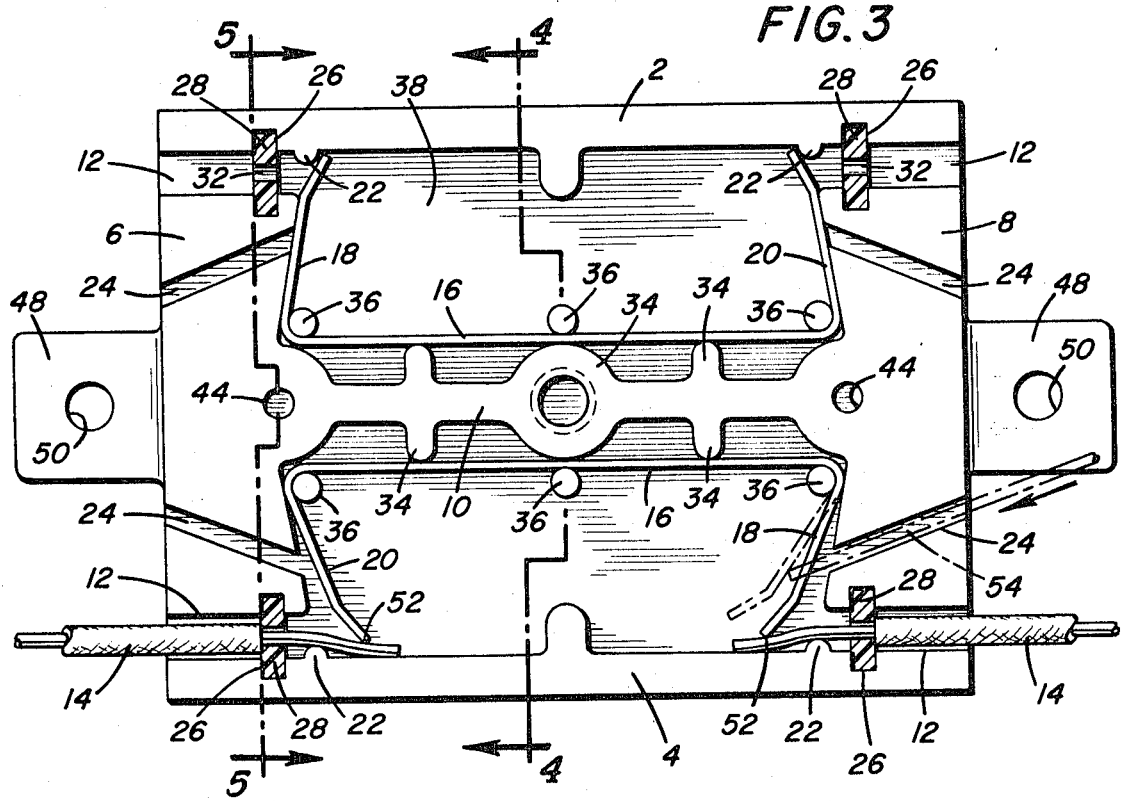
FIG. 3 is a plan view of the housing.
Figure 4:
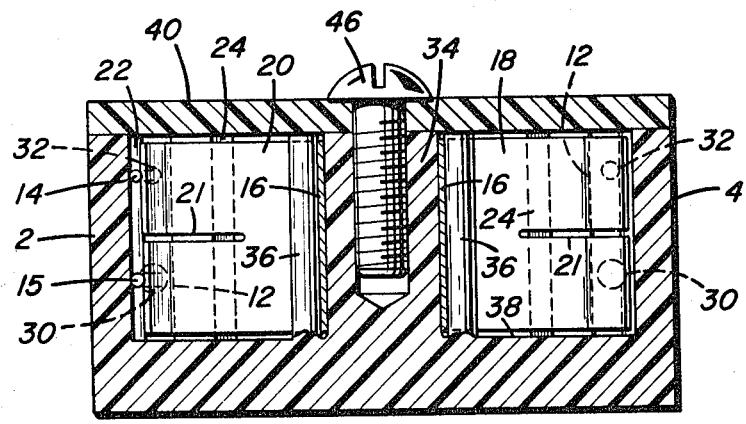
FIG. 4 is a section taken on the line 4–4 of FIG. 3.

In use, the stripped ends of the conductors are passed through openings 30, 32 over fulcrums 22 and under the ends of the leg members of the springs. Said leg members 18, 20 are split at their ends by slot 21 (FIG. 4) so that different size wires, such as 14 and 15, may be more positively gripped by the two halves of said leg members. The ends of the legs present corners 52 which can bite into the softer conductor and by slightly pulling on the conductor the leg will be caused to pivot and bend the conductor over the fulcrum 22 to produce a self-locking joint that will prevent movement of the conductor out of the box as illustrated in FIG. 3. In the event it becomes necessary to remove the conductor, a tool such as indicated at 54 is inserted through passageway 24 to force a leg such as 18 into the dotted line position illustrated in FIG. 3 to release the conductor.

In FIG. 1 my invention is shown as used in a row of fluorescent light fixtures. Each light fixture 56, 58, 60 is shown as provided with a pair of fluorescent lights 62, 64 connected to a ballast transformer 66 by conductors 68. Each transformer is connected to the terminal box of my invention by conductors 70. Power lines 72, 74 are connected to a source of power and to the first terminal box of the series. Power lines 76, 78 lead from the first terminal box of the series of fixtures to the next terminal box and from there power is fed to the following box by conductors 80, 82, and to the next box by conductors 84, 86 and so on through the series. Since the fixtures are spaced at predetermined distances, the wires can be cut to length and stripped and supplied to the installation in proper condition to be merely slipped into the terminal box as explained above to complete the wiring. While only three fixtures have been illustrated, it is not unusual to have a series of forty in each of several rows. By supplying precut and stripped wires for sliding into the boxes, the cost of installation is greatly reduced over the cost of hand fitting each connector.

I claim:

1. A terminal box comprising a housing of electrically non-conductive material having side and end walls, apertures in said end walls for guiding electric conductors into the housing, means movable in a selected path intersecting the axes of said apertures for locking the conductors against removal from the housing and comprising a leaf spring and a free end of said spring terminating adjacent a wall of the housing and including a fulcrum on said adjacent wall adjacent the free end of the spring; a tool passageway in each said end wall adjacent each aperture, the axis of said passageway intersecting the path of movement of the locking means; and a partition in each said aperture and spaced openings through said partitions.

2. A box as defined in claim 1, wherein the fulcrum is a post molded integrally with the sidewall.

3. A box as defined in claim 1, wherein an aperture in one end wall is aligned with an aperture in the other end wall and said locking means comprises a U-shaped leaf spring with the legs of the U overlaying the apertures, and means engaging the bight of the U securing the spring in the housing.

4. A box as defined in claim 3, wherein the means engaging the bight of the U comprises a plurality of spaced posts integrally molded with the housing.